(12) United States Patent
Zant et al.

(10) Patent No.: US 10,777,982 B2
(45) Date of Patent: Sep. 15, 2020

(54) ELECTRICAL BOX

(71) Applicant: ABB Schweiz AG, Baden (CH)

(72) Inventors: Nikolaus Zant, Raleigh, NC (US); Harald Martini, Vaesteras (SE); Sheng Zhong, Hillsborough, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/970,213

(22) Filed: May 3, 2018

(65) Prior Publication Data
US 2019/0341758 A1 Nov. 7, 2019

(51) Int. Cl.
*H02G 3/08* (2006.01)
*H01H 9/04* (2006.01)

(52) U.S. Cl.
CPC .............. *H02G 3/088* (2013.01); *H02G 3/081* (2013.01)

(58) Field of Classification Search
USPC ................................................ 169/48–49, 54
See application file for complete search history.

(56) References Cited

U.S. PATENT DOCUMENTS

| | | | |
|---|---|---|---|
| 4,616,104 A | 10/1986 | Lindsey | |
| 4,667,840 A | 5/1987 | Lindsey | |
| 4,748,066 A | 5/1988 | Kelly et al. | |
| 4,888,057 A | 12/1989 | Nguyen et al. | |
| 5,130,184 A | 7/1992 | Ellis | |
| 5,236,773 A | 8/1993 | Sorathia et al. | |
| 5,356,568 A | 10/1994 | Levine | |
| 5,985,385 A | 11/1999 | Gottfried | |
| 6,105,334 A | 8/2000 | Monson et al. | |
| 6,252,167 B1 * | 6/2001 | Rose | H02G 3/088 174/66 |
| 6,521,834 B1 | 2/2003 | Dykhoff et al. | |
| 7,812,253 B2 * | 10/2010 | Moselle | H02G 3/088 174/480 |
| 8,263,254 B2 * | 9/2012 | Mehta | H01M 2/0257 429/120 |
| 8,648,256 B1 * | 2/2014 | Rose | H02G 3/14 174/481 |
| 9,365,017 B2 * | 6/2016 | Kreysler | E04C 2/18 |
| 2004/0002559 A1 | 1/2004 | Troutman et al. | |
| 2006/0011108 A1 * | 1/2006 | Abu-Isa | B32B 27/18 108/57.25 |
| 2006/0068201 A1 | 3/2006 | Alexander et al. | |
| 2006/0083878 A1 | 4/2006 | Bauman | |
| 2006/0151758 A1 | 7/2006 | Reyes | |
| 2008/0241529 A1 | 10/2008 | Bauer et al. | |
| 2013/0280535 A1 * | 10/2013 | Maas | A62C 2/065 428/412 |

(Continued)

FOREIGN PATENT DOCUMENTS

| | | |
|---|---|---|
| EP | 0116846 A1 | 8/1984 |
| EP | 2472685 B1 | 11/2013 |
| EP | 2565009 B1 | 6/2014 |

*Primary Examiner* — Dimary S Lopez Cruz
(74) *Attorney, Agent, or Firm* — Taft Stettinius & Hollister LLP; J. Bruce Schelkopf

(57) ABSTRACT

The present disclosure is directed to a plastic fire resistant electrical box. The electrical box includes one or more walls having a substrate formed from a fire resistant intumescent material. The substrate can include a coating formed from an intumescent material composition applied to at least one of an inner and outer surface.

22 Claims, 2 Drawing Sheets

(56) References Cited

U.S. PATENT DOCUMENTS

2013/0288031 A1* 10/2013 Labock ................. C09D 5/185
  428/215
2017/0349776 A1* 12/2017 Peskens ............... C08F 212/08
2019/0100662 A1*  4/2019 Gottumukkala ....... C09D 5/185

* cited by examiner

ELECTRICAL BOX

TECHNICAL FIELD

The present application generally relates to a fire resistant plastic electrical box and more particularly, but not exclusively, to an electrical box made from a fire resistant intumescent substrate and coating to increase a fire rating.

BACKGROUND

Electrical boxes are used in building construction to house electrical components such as wires, switch assemblies, circuit breakers, and fuses or the like. Prior art plastic electrical boxes have various shortcomings relative to meeting certain fire rating certifications. Accordingly, there remains a need for further contributions in this area of technology.

SUMMARY

One embodiment of the present application is a unique electrical box designed to increase a fire resistance rating. Other embodiments include apparatuses, systems, devices, hardware, methods, and combinations of a unique electrical box made from an intumescent substrate and coating system to increase a fire rating of an electrical box made from a plastic substrate. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
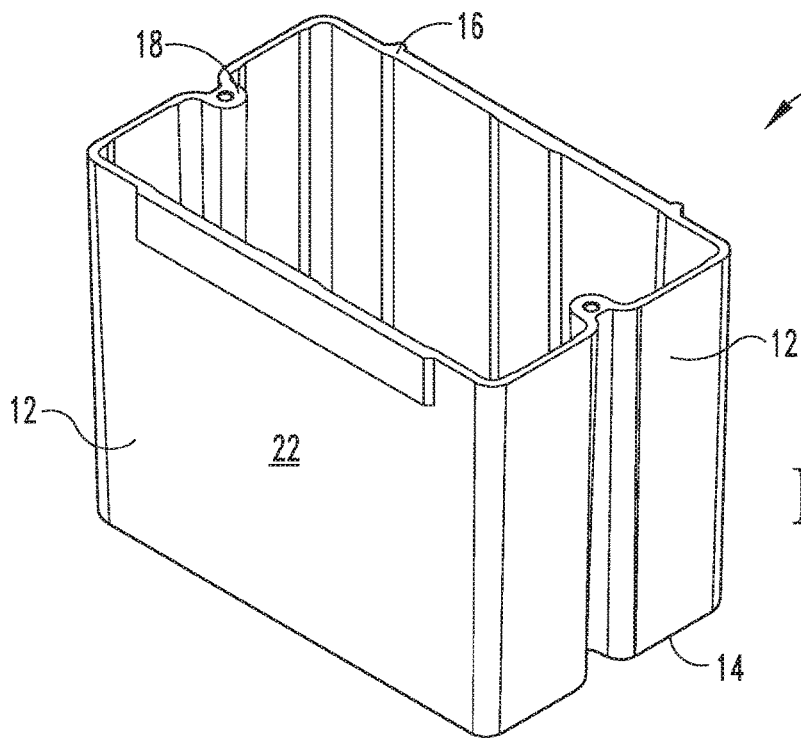
FIG. 1 is a perspective view of an exemplary electrical box according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring now to FIG. 1, a perspective view of an exemplary electrical housing or box 10 according to one embodiment of the present disclosure is illustrated. The electrical box 10 can be of the type to hold, contain or connect with an electrical apparatus such as, by way of example and not limitation, wires, switches, fuses, relays, plug outlets and other electrical components as one skilled in the art would understand. It should be noted that the term "electrical box" should not be limiting in any manner. When the term electrical box is used in the present application, it may be associated with switchboards, electrical panels, electrical conduits, electrical conductors as well as other electrical apparatus. Further, the electrical box 10 may be a complete enclosure in some forms, may have open sides in some forms and/or have through apertures formed in one or more of the walls. The electrical box 10 disclosed herein is typically located in a wall of a building, however is not limited as such. The design and material composition of the electrical box 10 are configured in such a way so as to increase a fire rating over prior electrical boxes made from a regular plastic material. By way example, regular plastic material can be defined as synthetic polymeric materials, such as polyvinyl chloride (PVC), phenolic materials, polyethylene, polypropylene, polycarbonate and polystyrene as well as others known to those skilled in the art.

The electrical box 10 can include a plurality of side walls 12, a bottom wall 14 and a top wall 16. It should be noted that other configurations of electrical box constructions such as a single arcuate wall or the like are also contemplated herein. One or more design features 18 can be formed with one or more of the walls 12, 14 and/or 16 such as a fastener aperture or the like. Each of the walls 12, 14 and/or 16 includes an inner surface 20 and an outer surface 22. In some forms each wall 12, 14 and/or 16 can include a substrate made solely from an intumescent plastic material. The intumescent polymer material for the substrate can include expandable graphite, silica or other additives such as an acid catalyst (e.g. ammonium polyphosphate) and a blowing agent such as melamine. The intumescent polymer material may include other additives such as glass fiber, short glass fiber, long glass fiber, carbon fiber, rubber additives, and fillers such as magnesium hydride, kaolinite, talc, etc. to provide adequate mechanical strength to the electrical box 10. The intumescent substrate can expand from between approximately 2.5 and 25 times the substrate wall thickness during a fire event. In one form the wall thickness of the substrate can be approximately 2 mm so the expansion can be between 0.5 cm and 5 cm during a fire event.

An intumescent coating can be applied to a surface 20 and/or 22 of the substrate. In other forms, each wall 12, 14 and/or 16 can include a substrate made from a combination of an intumescent plastic material and a regular plastic material with an intumescent coating applied to a surface thereof. In yet other forms each wall 12, 14 and/or 16 can be made entirely from a substrate formed from an intumescent plastic material without an intumescent coating.

Figure 2A:
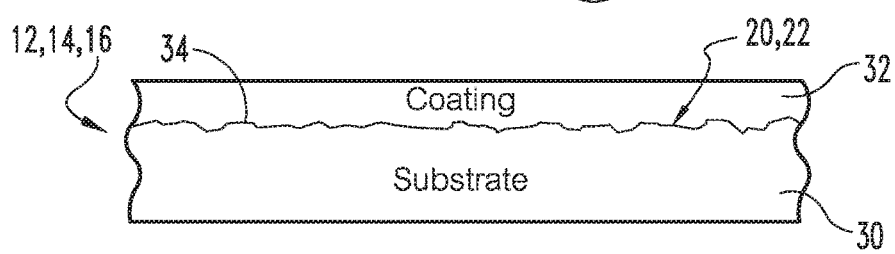
FIG. 2A is a schematic cross sectional view of a portion of a wall according to another embodiment for the exemplary electrical box of FIG. 1.
Figure 2B:
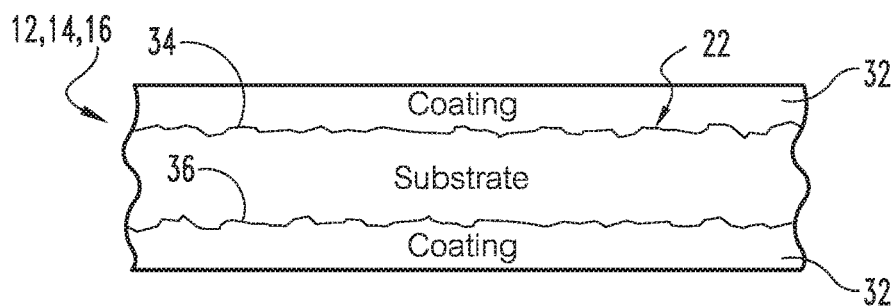
FIG. 2B is a schematic cross sectional view of a portion of a wall according to one embodiment for the exemplary electrical box of FIG. 1.

Referring now to FIG. 2A, a schematic cross sectional view of a portion of a wall 12, 14, and/or 16 of the electrical box 10 (shown in FIG. 1) with a coating on one side thereof is illustrated. The wall 12, 14, and/or 16 is defined by a substrate 30 with a coating 32 applied to a surface 20 and/or 22 thereof. FIG. 2B is a schematic cross sectional view of a portion of a wall 12, 14, and/or 16 of the electrical box 10 with a coating 32 applied to each of the surfaces 20, 22. The coating 32 can be applied to the substrate 30 by various methods. By way of example and not limitation, the applying methods can include spraying, dipping, brushing or other means known to those skilled in the art.

A predefined surface roughness 34, 36 can be formed on the surfaces 20, 22 respectively, of the substrate 30 so as to increase adhesion strength between the coating 32 and the substrate 30. The surface roughness of the walls of the substrate 30 range from 0.01 mm to 1 mm. However a surface roughness outside of this range is also contemplated herein. In some embodiments, the surfaces 20, 22 can be machined, sand blasted or chemically etched, ozone etched and/or treated with ultra-violet light after the substrate 30 has been formed to create the desired surface finish. In other embodiments, a mold can be formed with a desired surface finish so that one or more of the surfaces 20, 22 of the substrate 30 is molded with a desired surface roughness or finish and will not need to have finishing processes performed subsequent to forming the substrate 30. The surface treatment of the outer and/or inner substrate surfaces 20, 22 allows the coating to fill in the abrasions or interstices created therein.

Figure 3:
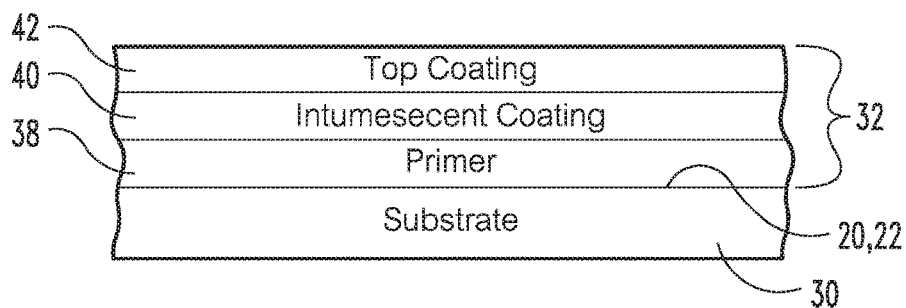
FIG. 3 is a schematic cross sectional view of a portion of a wall according to another embodiment for the exemplary electrical box of FIG. 1.

Referring now to FIG. 3, a schematic cross sectional view of a portion of a wall 12, 14, and/or 16 of the electrical box 10 is illustrated. A coating 32 can include a primer coat 38, a primary coating formed from an intumescent material 40 and a top coating 42. The primer 38 is operable to enhance adhesion of the coating 32 to the substrate 30. The primer 38 can include binders, acrylic paint, organic and/or inorganic solvents, and enamels. The primer 38 can be applied to the substrate 30 at a thickness from approximately between 0.01 mm and 1.0 mm. After the primer has dried, the intumescent coating 40 can be applied over the primer coating 38. The intumescent coating 40 can include one or more material compositions selected from a group of materials that provides fire resistant properties to the electrical box 10. In some forms, the intumescent coating 40 may have an applied thickness in a range of approximately between 0.1 mm and 5 mm depending on the application. The thickness of the coating 40 is dependent on adhesion qualities of the specific material composition.

The intumescent materials cause the coating to expand and form a foam and/or a char that is effective in reducing heat transfer into the substrate 20 of the electrical box 10. Intumescent coatings protect structures from fires by forming a highly porous insulating carbon char layer that expands up to 100 times the thickness of the originally applied coating layer. During expansion of the coating, inert gases such as nitrogen, carbon dioxide and water vapor are released. These inert gases can starve a fire of oxygen near the coating as well as to provide a cooling heat sink.

Intumescent coatings can include a soft char or hard char material. Soft char coatings can include an acid catalyst such as a polyphosphate, a crosslinking agent such as pentaerythritol, a blowing agent such as melamine, a filler material and a binder. Hard char coatings can include expandable graphite and various silicates such as Na2SiO3 to form an insulation layer. In one embodiment, the expandable graphite is expandable with an intercalated gas. The hard char materials typically expand under higher pressure than soft char materials. As such hard char coatings can be used to seal openings upon activation.

The intumescent coating 40 can be a water based, resin-based or thermoplastic intumescent based coating. The intumescent coating 40 can include, but is not limited to kaolinite, talc, granular hydrated alkali metal silicate, an intercalated graphite, acid treated graphite hydrated alkali metal silicates, vermiculite, perlite NaBSi, volcanic glass with a carbon dioxide blowing agent. Other additives can include, but are not limited to glass fiber, short glass fiber, long glass fiber, carbon fiber, rubber additives, kaolinites or other similar constituents. Water or solvent content should be less than ten percent so that the viscosity is high enough to prevent undue flow off of the substrate prior to drying. In some forms the intumescent coating can expand from 50 to 100 times the original volume when heated at between 150 degrees Celsius and 300 degrees Celsius. In one example, the intumescent coating 32 is formed from 1 to 15 percent by weight of trimethylsilylated silica; 30 percent to 40 percent by weight of sodium silicate; 55 percent by weight of water; and from 0.1 percent to 10 percent by weight of an additive.

In some forms the intumescent coating 40 can be mixed with the primer 38 and applied to the substrate 30 in one application. When the primer and the intumescent coating are combined into a single coating, the intumescent material should be at least fifty percent by weight relative to the primer material.

A top coat 42 may be applied to the intumescent coating 40 to protect against moisture infiltration and to ensure that the intumescent coating 40 retains functionality. The top coat 42 can include a polyethylene, polyurethane and other clear polymer material. In some forms the applied thickness of the top coat can be 2 mm or less. In more preferred forms the applied thickness of the top coat can be 1 mm or less.

The intumescent coating may undergo a drying or aging process after application to the substrate surface to increase coating adhesion and stability. The coating may be aged using a heat source such as an ultra-violet light treatment in an environment in which temperature and humidity are controlled. The drying process can include directing heat to the back of the substrate 30 so that any solution liquid will be evaporated before the coating surface is hardened. A predefined threshold heating temperature can be approximately 100 Celsius or below to ensure the integrity of the plastic box 10. The speed of the temperature rise to the threshold temperature can be relatively fast in a range of approximately five seconds, however the heat input into the plastic box 10 is slow enough to ensure the evaporation of solvents and the liquid solution prior to hardening of the coating surface. The total time for aging can be in the range of less than one minute to several minutes depending on the coating chemistry and thickness.

In an alternate embodiment, the intumescent coating can be combined with an injection molding process. An intumescent powder material can be applied to a mold surface before molding of the base substrate. During molding, a hot polymer melt is poured in the mold and fills a mold cavity until contacting the intumescent coating in the mold. In one form, a mold pressure can be held between 400 and 600 bars or greater so as to ensure adhesion between the coating and the substrate. After polymer substrate cools down, the intumescent coating is attached on the surface of the substrate with a sufficient adhesion strength.

Figure 4A:
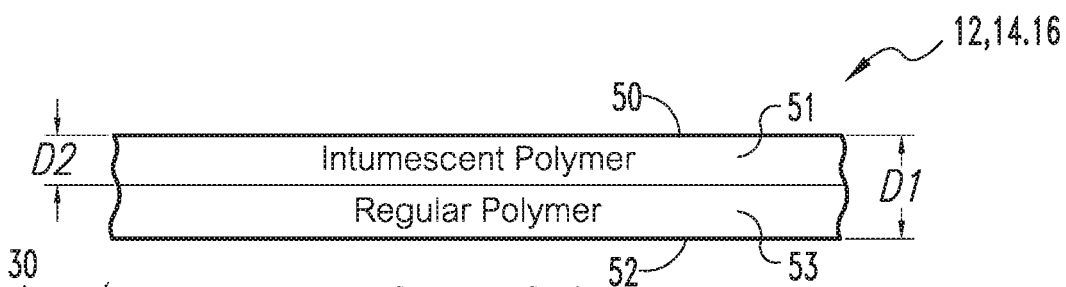
FIG. 4A is a schematic cross sectional view of a portion of a wall according to another embodiment for the exemplary electrical box of FIG. 1.

Referring now to FIG. 4A, a schematic cross sectional view of a portion of a wall 12, 14, and/or 16 of the electrical box 10 according to another exemplary embodiment is illustrated. The wall 12, 14, and/or 16 is formed with an intumescent polymer material 50 in an outer layer 51 of the substrate 30 and with a regular polymer material 52 in an inner layer 53 of the substrate 30. While not shown, the substrate 30 in this embodiment may optionally include an intumescent coating as discussed above. A total thickness D1 of the substrate 30 includes a thickness D2 of the intumescent portion that is at least fifty percent of the total thickness D1.

Figure 4B:
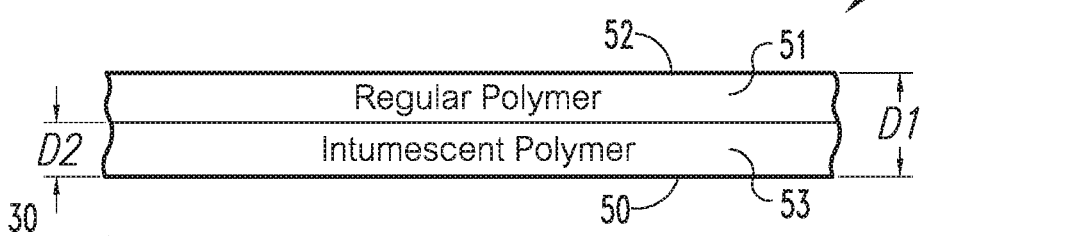
FIG. 4B is a schematic cross sectional view of a portion of a wall according to another embodiment for the exemplary electrical box of FIG. 1.

Referring now to FIG. 4B, a schematic cross sectional view of a portion of a wall 12, 14, and/or 16 of the electrical box 10 according to another exemplary embodiment is illustrated. The wall 12, 14, and/or 16 is formed with an intumescent polymer material 50 in an inner layer 53 of the substrate 30 and with a regular polymer material 52 in an outer layer 53 of the substrate 30. While not shown, the substrate 30 in this embodiment may optionally include an intumescent coating as discussed above. A total thickness D1 of the substrate 30 includes a thickness D2 of the intumescent portion that is at least fifty percent of the total thickness D1.

Figure 4C:
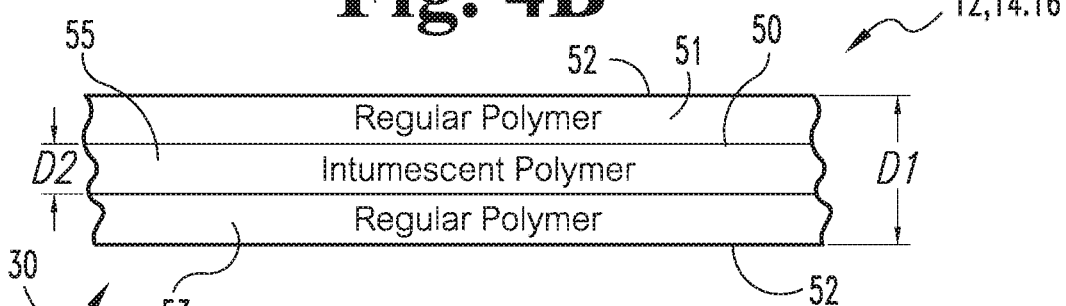
FIG. 4C is a schematic cross sectional view of a portion of a wall according to another embodiment for the exemplary electrical box of FIG. 1.

Referring now to FIG. 4C, a schematic cross sectional view of a portion of a wall 12, 14, and/or 16 of the electrical box 10 according to another exemplary embodiment is illustrated. The wall 12, 14, and/or 16 is formed with an intumescent polymer material 50 in an intermediate layer 55 of the substrate 30 and with a regular polymer material 52 in an inner layer 53 and an outer layer 51 positioned on either side of the intermediate layer 55. While not shown, the substrate 30 in this embodiment may optionally include an intumescent coating as discussed above. A total thickness D1 of the substrate 30 includes a thickness D2 of the intumescent polymer portion that is at least fifty percent of the total thickness D1.

Figure 4D:
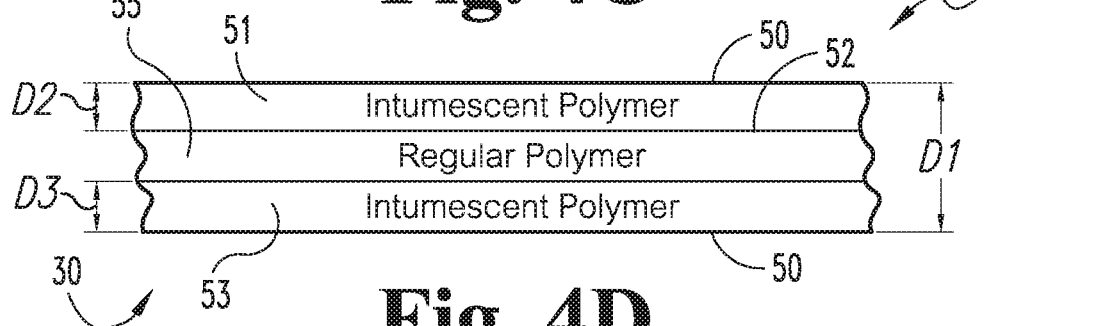
FIG. 4D is a schematic cross sectional view of a portion of a wall according to another embodiment for the exemplary electrical box of FIG. 1.

Referring now to FIG. 4D, a schematic cross sectional view of a portion of a wall 12, 14, and/or 16 of the electrical box 10 according to another exemplary embodiment. The wall 12, 14, and/or 16 is formed with a regular polymer material 52 in an intermediate layer 55 of the substrate 30 and with an intumescent polymer material 55 in an inner layer 53 and an outer layer 51 positioned on either side of the intermediate layer 55. While not shown, the substrate 30 of this embodiment may optionally include an intumescent coating as discussed above. A total thickness D1 of the substrate 30 includes intumescent polymer portions having thicknesses D2 and D3 that together are at least fifty percent of the total thickness D1.

It should be noted that the substrate 30 may include multiple repeated layers of those that are shown in FIGS. 4A-4D. For example, FIGS. 4A and 4B may include two or more layers of regular and intumescent polymer material layers and FIGS. 4C and 4D may include multiple three layer stacks for the substrate.

Figure 4E:
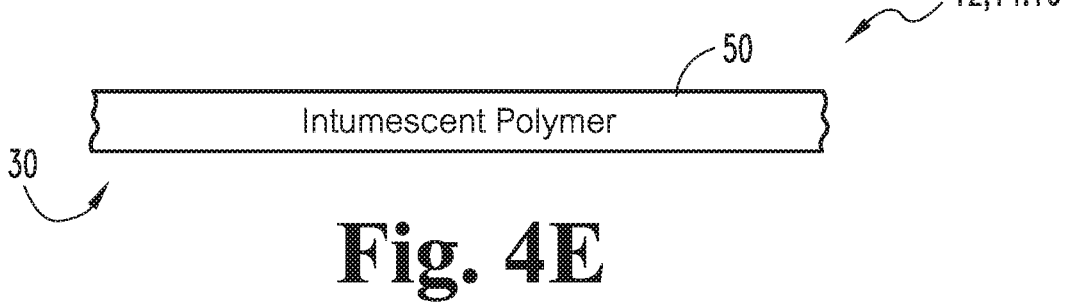
FIG. 4E is a schematic cross sectional view of a portion of a wall according to another embodiment for the exemplary electrical box of FIG. 1.

Referring now to FIG. 4E, a schematic cross sectional view of a portion of a wall 12, 14, and/or 16 of the electrical box 10 according to another exemplary embodiment is illustrated. The wall 12, 14, and/or 16 includes a substrate 30 formed entirely of an intumescent polymer material 50. While not shown, the substrate 30 of this embodiment may optionally include an intumescent coating as discussed above.

In one aspect, the present disclosure includes an electrical box comprising: a wall formed from a substrate including an intumescent polymer material, the wall having an inner and outer surface; and a coating made at least partially from an intumescent material applied to one of the inner or outer surfaces of the wall.

In refining aspects the substrate includes a layer of intumescent polymer material and a layer of regular polymer material; wherein the intumescent polymer material is at least fifty percent of the total substrate material; wherein the substrate includes a layer of intumescent polymer material positioned between opposing layers of regular polymer material; wherein the substrate includes a layer of regular polymer material positioned between opposing layers of intumescent polymer material; further comprising a coating made at least partially from an intumescent material applied to the other of the inner or outer surface of the wall; wherein the intumescent polymer of the substrate and the intumescent coating expands within a temperature range of about 150 to 300 degrees Celsius; wherein the substrate expands up to 25 times and the coating expands up to 100 times of an original volume when the temperature exceeds a threshold value; wherein the surface of the wall includes a formed roughness of between approximately 0.01 mm and 1.0 mm; wherein the coating includes a primer coat, an intumescent mid-coat and a top coat; wherein the coating includes at least one of an acid catalyst, a cross linking agent, a blowing agent, a binder material and a filler material; wherein the coating includes one of a hard char, a soft char or a combination of a hard char and soft char; wherein the coating is formed from 1 to 15 percent by weight of trimethylsilylated silica; 30 percent to 40 percent by weight of sodium silicate; 55 percent by weight of water; and from 0.1 percent to 10 percent by weight of an additive; and wherein the coating includes expandable graphite and silicates.

Another aspect of the present disclosure includes a fire resistant electrical box comprising: a plurality of walls formed from a fire resistant plastic based substrate and a fire resistant coating; wherein the plastic substrate includes an intumescent material; and wherein the coating is formed from an intumescent material composition.

In refining aspects, the fire resistant electrical box includes wherein the substrate includes an intumescent polymer material and a regular polymer material; wherein the intumescent polymer material is at least fifty percent of the substrate material; wherein the substrate includes at least one layer of intumescent polymer material positioned between a pair of opposing layers of regular polymer material and/or a layer of regular polymer material positioned between a pair of opposing layers of intumescent polymer material; wherein the coating is applied to both an inner surface and an outer surface of each of the walls; wherein a surface roughness of between approximately 0.01 mm and 1.0 mm is formed on the walls prior to applying the coating; wherein the coating includes a primer coat, an intermediate intumescent based coat and a top coat;

Another aspect of the present disclosure includes a method of forming a fire resistant plastic electrical box comprising: forming a substrate made from an intumescent material; forming a rough surface on a coating interface region of the substrate; and applying an intumescent coating to at least one of an inner and an outer surface of the substrate.

In refining aspects, the present disclosure includes a method further comprising applying a primer coat to the substrate prior to applying the intumescent coating; further comprising applying a top coat over the intumescent coating; further comprising drying the coating at 100 degrees Celsius or below; and wherein the drying includes applying heat to the substrate at an opposing surface to that of the surface of the coating.

Another aspect of the present disclosure includes a method of forming fire resistant electrical housing comprising: spraying an intumescent coating powder onto a surface of a mold; melting a polymer having an intumescent material composition; pouring the melted polymer material into the mold; pressurizing the mold at 400 to 600 bars or above; melting the intumescent coating powder with the heat of the intumescent polymer material; and cooling the mold such that the coating adheres to an outer surface of the polymer material.

In refining aspects, the present disclosure includes a method wherein the intumescent polymer material forms a substrate for a wall of the electrical housing; wherein the intumescent polymer material is at least fifty percent of the total material composition of the substrate; and wherein the coating is at least 0.1 mm thick.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An electrical box comprising:
    a wall formed from a substrate including an intumescent polymer material, the wall having an inner and outer surface; and
    a coating made at least partially from an intumescent material applied to one of the inner or outer surfaces of the wall;
    wherein the substrate includes a layer of intumescent polymer material positioned between opposing layers of regular polymer material.

2. The electrical box of claim 1, wherein the intumescent polymer material is at least fifty percent of the total substrate material.

3. The electrical box of claim 1, further comprising a coating made at least partially from an intumescent material applied to the other of the inner or outer surface of the wall.

4. The electrical box of claim 1, wherein the intumescent polymer of the substrate and the intumescent coating expands within a temperature range of about 150 to 300 degrees Celsius.

5. The electrical box of claim 4, wherein the substrate expands up to 25 times and the coating expands up to 100 times of an original volume when the temperature exceeds a threshold value.

6. The electrical box of claim 1, wherein the surface of the wall includes a formed roughness of between approximately 0.01 mm and 1.0 mm.

7. The electrical box of claim 1, wherein the coating includes a primer coat, an intumescent mid-coat and a top coat.

8. The electrical box of claim 1, wherein the coating incudes at least one of an acid catalyst, a cross linking agent, a blowing agent, a binder material and a filler material.

9. The electrical box of claim 1, wherein the coating includes one of a hard char, a soft char or a combination of a hard char and soft char.

10. The electrical box of claim 1, wherein the coating is formed from 1 to 15 percent by weight of trimethylsilylated silica; 30 percent to 40 percent by weight of sodium silicate; 55 percent by weight of water; and from 0.1 percent to 10 percent by weight of an additive.

11. The electrical box of claim 1, wherein the coating includes expandable graphite and silicates.

12. An electrical box comprising:
    a wall formed from a substrate including an intumescent polymer material, the wall having an inner and outer surface; and
    a coating made at least partially from an intumescent material applied to one of the inner or outer surfaces of the wall;
    wherein the intumescent polymer of the substrate and the intumescent coating expands within a temperature range of about 150 to 300 degrees Celsius; and
    wherein the substrate expands up to 25 times and the coating expands up to 100 times of an original volume when the temperature exceeds a threshold value.

13. The electrical box of claim 12, wherein the substrate includes a layer of intumescent polymer material and a layer of regular polymer material.

14. The electrical box of claim 13, wherein the intumescent polymer material is at least fifty percent of the total substrate material.

15. The electrical box of claim 13, wherein the substrate includes a layer of regular polymer material positioned between opposing layers of intumescent polymer material.

16. The electrical box of claim 12, further comprising a coating made at least partially from an intumescent material applied to the other of the inner or outer surface of the wall.

17. The electrical box of claim 12, wherein the surface of the wall includes a formed roughness of between approximately 0.01 mm and 1.0 mm.

18. The electrical box of claim 12, wherein the coating includes a primer coat, an intumescent mid-coat and a top coat.

19. The electrical box of claim 12, wherein the coating incudes at least one of an acid catalyst, a cross linking agent, a blowing agent, a binder material and a filler material.

20. The electrical box of claim 12, wherein the coating includes one of a hard char, a soft char or a combination of a hard char and soft char.

21. The electrical box of claim 12, wherein the coating is formed from 1 to 15 percent by weight of trimethylsilylated silica; 30 percent to 40 percent by weight of sodium silicate; 55 percent by weight of water; and from 0.1 percent to 10 percent by weight of an additive.

22. The electrical box of claim 12, wherein the coating includes expandable graphite and silicates.

* * * * *